United States Patent Office 3,290,165
Patented Dec. 6, 1966

3,290,165
SURFACE MODIFIED PIGMENTS
Joseph Iannicelli, Macon, Ga., assignor to J. M. Huber Corporation, Locust, N.J., a corporation of New Jersey
No Drawing. Filed Apr. 1, 1963, Ser. No. 269,695
8 Claims. (Cl. 106—308)

This application is a continuation-in-part of applicant's copending application Serial No. 189,321, filed April 23, 1962, entitled "Surface Modified Pigments," and now abandoned.

This invention relates to finely divided particulate inorganic pigments modified with amino organosilanes and the process for their production.

When inorganic pigments are modified with the silanes according to this invention, the properties imparted to them are such that they can advantageously be used as fillers for thermosetting resins such as polyurethanes, epoxy polymers, melamine polymers, phenolic polymers, ureaformaldehyde polymers, unsaturated polyesters, as well as other polymers and elastomers including polyethylenes, polypropylenes, polystyrenes, saturated polyesters, polyamides, polyvinyl compounds, polyisoprenes, polybutadienes, polystyrenebutadienes, and the like.

The modified pigments can also be advantageously used as fillers for paper, paints, varnishes, inks, and paper coating compositions.

By the use of these modified finely divided particulate inorganic pigments, improved physical properties are imparted to the vehicles into which they are incorporated.

Inorganic pigments modified with amino organosilanes have affinity for direct dyes and are useful for imparting various colors to the vehicles.

An object of this invention is to provide modified pigments especially useful as fillers.

Another object of this invention is to provide modified pigments which are dyeable with direct dyes and are useful as color-imparting fillers.

A further object of this invention is to provide modified pigments which can be used as fillers in applications where they had heretofore been unsatisfactory.

A still further object of the invention is to provide cross-linkable fillers capable of imparting improved abrasion resistance among other improved properties to elastomers.

Other objects and advantages will be apparent from the following specification.

I am aware of extensive efforts in the prior art to improve properties of filler pigments by modification with organosilanes. Hydrocarbon silane modifications of pigments do impart improved dispersions in organic vehicles but such modifications do not normally increase reinforcement in vinyl addition polymers unless the hydrocarbon silane carries specific types of unsaturation which serves to promote a more tenacious bridge between the filler and the vehicle. In any case, all these prior art modified pigments are rendered hydrophobic by modification with either saturated or unsaturated hydrocarbon silanes and, furthermore, such silane modified pigments are not valuable reinforcing fillers in saturated thermosetting resins.

I have discovered that modification of filler pigments with saturated amino organosilanes improves reinforcement in a wide variety of vinyl addition as well as thermosetting polymers in that a strong chemical bridge between filler pigment and polymer results. Bridging is accomplished through the amino modified surface of the pigments. Surprisingly, amino organosilane modification improves reinforcement in both vinyl addition and thermosetting polymers, whereas unsaturated organosilane fillers are generally only effective in vinyl addition polymers where unsaturation is present. Another important advantage of amino organosilane modified fillers is that they are usually hydrophilic whereas prior art silane modified fillers are hydrophobic.

The modified pigments of this invention can be prepared by dissolving the desired amount of amino organosilane in a suitable solvent, adding the pigment and heating until the reaction is complete. The amount of modifier added depends upon the particular pigment being modified and the use for which it is intended. Generally up to about 15% by weight of the modifier is sufficient for most purposes.

A particularly useful process of modifying pigments according to this invention involves spray drying pigment slurries having one or more of the amino organosilanes dispersed therein. The spray drying process effects a uniform distribution of the modifier on the pigment and virtually instantaneously cures the modifier on the pigment.

The compounds used to modify the pigments can be depicted by the formula:

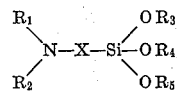

wherein $R_1$ is hydrogen, alkyl, aryl, cycloalkyl, or alkylaryl; $R_2$ is hydrogen, alkyl, aryl, cycloalkyl or alkylaryl; $R_3$ is hydrogen, lower alkyl, aryl, lower alkylaryl, or lower arylalkyl; $R_4$ is hydrogen, lower alkyl, aryl, lower alkylaryl or lower arylalkyl; $R_5$ is hydrogen, lower alkyl, aryl, lower alkylaryl or lower arylalkyl; and X is alkylene, arylene, alkylarylene, arylalkylene, cycloalkylene having secondary and/or tertiary nitrogen present in the chain, and/or primary, secondary, and/or tertiary nitrogen pendant from the chain. Some of these amino organosilanes are disclosed along with methods for their preparation in U.S. Patents Nos. 2,832,754; 2,930,809; 3,007,957; and 3,020,302. Commercially available amino organosilanes include "A–1100" (gamma aminopropyltriethoxysilane) and "Y–2967" (an amino silane which is a modified gamma aminopropyltriethoxysilane) sold by Union Carbide Corporation, N.Y., N.Y., and "Z–6020" (a diamino functional silane) sold by Dow Corning Corporation, Midland, Michigan.

Pigments advantageously modified in the practice of this invention are finely divided particulate inorganic pigments such as, for example, inorganic compounds of silicon, including hydrated or anhydrous silicas, calcium silicates, magnesium silicates, calcium-magnesium silicates, barium silicates, aluminum silicates, sodium-alumino-silicates, calcium-alumino-silicates, calcium-sodium alumino silicates; clays such as kaolins which include dickite, kaolinite and nacrite, halloysite, montmorillonites including sodium and magnesium bentonites, synthetic or natural zeolites; various metal oxides and carbonates such as zinc oxide, alumina, titania or magnesia, calcium carbonate; and various non-white pigments like carbon blacks, zinc sulfide, ferric oxide and the like.

All the above fillers are available on a commercial scale and include the following, all of which are finely divided, particulate substances.

Zeosil®, very finely divided precipitated hydrated silimino silicate pigments of submicron particle size and disclosed in U.S. Patents 2,739,073 and 2,848,346.

Zerosil®, very finely divided precipitated hydrated silicas of submicron particle size and disclosed in copending U.S. patent applications Serial No. 144,168 filed October 10, 1961, and 149,964 filed November 3, 1961.

Suprex®, an air floated kaolin clay with platelike particles of which 87–92% are minus 2 microns.

Aromex®, intermediate super abrasion furnace carbon blacks.

Essex®, semi-reinforcing furnace blacks.

Silene EF®, a precipitated hydrated calcium silicate of very fine particle size.

Hi-Sil®, a precipitated hydrated silica of very fine particle size.

Celite®, a diatomaceous earth which is principally a hydrated silica.

Alumina C®, a hydrated aluminum oxide of small particle size.

Kadox®, a zinc oxide filler.

Titanox®, a pigment grade commercial titanium dioxide.

Cab-O-Sil®, a very finely divided anhydrous silica.

Ludox®, a precipitated silica of very fine particle size.

The following examples illustrate typical methods by which various pigments are surface modified in accordance with this invention.

*Example 1*

8 grams of gamma aminopropyltriethoxysilane (A–1100) was dissolved in 3.3 liters of benzene in a 5-liter round bottom flask. 400 grams of carbon black (ISAF) was added and the resulting mixture was refluxed 2 hours. The resulting product contained 2% of the modifier based on the weight of the carbon black.

*Example 2*

"Suprex" was modified with 1.0% by weight with gamma aminopropyltriethoxysilane by adding the appropriate amount of the modifier using water as a solvent and then adding the clay and refluxing for 2½ hours. The products were recovered and dried. The example was repeated with 2.0% and 3.0% gamma aminopropyltriethoxysilane.

*Example 3*

"Zeolex 23" was modified with 1% by weight with gamma aminopropyltriethoxysilane by adding the "Zeolex" to a benzene solution of the modifier and refluxing for 2½ hours. The product was recovered and dried.

*Example 4*

"Suprex" was modified with 1.0% of "Z–6020" by adding 3.33 pounds "Z–6020" to 667 pounds of water while under agitation. 333 pounds of "Suprex" was slowly added to the solution while continuing the stirring until a homogeneous clay slip resulted. The clay slip was then spray dried in a 7-foot conical spray dryer operated at an inlet temperature of 600° F. and an outlet temperature of 250° F. A finely pulverized, chemically modified clay product was obtained. The example was repeated to produce 2.0% and 3.0% modifications of the "Suprex."

*Example 5*

Example 4 was repeated using "Y–2967" instead of "Z–6020."

*Example 6*

Example 4 was repeated using "A–1100" instead of "Z–6020."

*Example 7*

"Suprex" was modified with 1% of gamma aminopropyltriethoxysilane by adding 10 grams gamma aminopropyltriethoxysilane to 3.5 liters benzene, then adding 1 kilogram "Suprex" clay and refluxing for 3 hours. The modified clay was recovered and dried. This example was repeated using 2% and 3% instead of 1% gamma aminopropyltriethoxysilane.

*Example 8*

Example 7 was repeated using "Z–6020" in place of gamma aminopropyltriethoxysilane.

*Example 9*

Example 7 was repeated using "Y–2967" in place of gamma aminopropyltriethoxysilane.

The above examples illustrate the facility with which various inorganic pigments are modified with amino organosilanes.

The examples were repeated using each of the pigments named herein to produce modified pigments having properties similar to those discussed below.

While only three modifiers are exemplified, this is done for convenience since all those disclosed herein have been used for the purpose and come within the scope of this invention.

The physical properties of the various pigments disclosed herein are significantly altered by modification with the group of silanes disclosed herein. For example, when kaolin clay is so modified, a dramatic change in its properties is apparent. Where, before, the clay lacked significant affinity for direct dyes, it is modified by the process of this invention to be readily dyeable with direct dyes. The modified kaolin clays can be used as a filler for polyurethanes where, before modification, it was unusable since it prevented a cure of the polymer. This is illustrated in Table I in which the following formulation was employed:

| | Parts |
|---|---|
| Vibrathane 5003 [1] | 100 |
| Stearic acid | 0.25 |
| Di-Cup 40C [2] | 5 |
| Clay | 60 |

[1] A polyurethane produced by Naugatuck Chemical Division of U.S. Rubber Company.
[2] A polymerizing cross-linking agent produced by Hercules Powder Company.

The compounds were mixed on a 6-inch by 12-inch laboratory mill and cured for 30 minutes at 307° F., except for the NBS abrasion test where the cure was for 60 minutes at 307° F.

TABLE I

| | Control | Suprex | Example 2 | | |
|---|---|---|---|---|---|
| | | | Suprex plus 1% Modifier | Suprex plus 2% Modifier | Suprex plus 3% Modifier |
| Parts filler/100 parts polymer | None | 60 | 60 | 60 | 60 |
| Tensile, p.s.i. | 5,240 | No cure | 3,680 | 3,770 | 3,840 |
| Stress, 300%, p.s.i. | 830 | No cure | 2,070 | 3,190 | |
| Elongation, percent | 500 | No cure | 470 | 425 | 285 |
| Shore A Hardnessg | 56 | No cure | 71 | 71 | 75 |
| NBS Abrasion, percent of standard | 129 | No cure | 122 | 172 | 202 |

The results illustrate the improved properties of modified kaolin clay filled polyurethane over both the compound filled with unmodified kaolin and the unfilled compound. Note, for example, the increase in abrasion resistance with increased modification of kaolin. It is also apparent from the data that unmodified kaolin is unsatisfactory as a filler for polyurethanes since the polymer did not cure. The use of modified kaolin clay not only improves the properties of the polyurethane but also decreases the raw material cost since the filler is much less expensive than the polymer.

it imparts to rubber are improved in respect to modulus, tensile, and abrasion resistance.

When modified Zeolex is used as a filler for rubber compounds, it imparts to the rubber improved properties of modulus, tensile strength, tear resistance and abrasion

TABLE II.—MODIFIED SUPREX CLAYS IN VIBRATHANE 5003

| Physical Properties | Minutes Cured at 305° F. | Unfilled Control | Suprex Filled Control | Example 2 | | Example 4 | Example 8 | Example 9 |
|---|---|---|---|---|---|---|---|---|
| | | | | 1% Modifier Water | 2% Modifier Water | 1% Z-6020 Water | 1% Z-6020 Benzene | 1% Y-2967 Benzene |
| 200% Modulus | 30 | 430 | 1,270 | 1,340 | 2,900 | | 2,900 | 1,710 |
| | 60 | 500 | 1,310 | 1,530 | 2,990 | 2,890 | 1,710 | |
| | 75 | 510 | 1,330 | 1,480 | 2,820 | | 2,860 | 1,840 |
| 300% Modulus | 30 | 830 | 1,570 | 2,070 | 3,190 | | 3,270 | 2,060 |
| | 60 | 1,050 | 1,640 | 2,220 | 3,340 | 3,330 | 3,270 | 2,090 |
| | 75 | 1,040 | 1,630 | 2,520 | 3,200 | | 3,240 | 2,170 |
| Tensile Strength | 30 | 5,240 | 4,340 | 3,680 | 3,770 | 2,960 | 3,470 | 4,040 |
| | 60 | 4,890 | 3,850 | 3,920 | 3,490 | 3,620 | 3,290 | 3,610 |
| | 75 | 5,320 | 3,640 | 3,560 | 3,510 | | 3,240 | 3,950 |
| Elongation | 30 | 500 | 570 | 470 | 425 | 190 | 365 | 560 |
| | 60 | 440 | 525 | 450 | 335 | 360 | 315 | 500 |
| | 75 | 450 | 505 | 440 | 370 | | 300 | 510 |
| Hardness, Shore A | 30 | 56 | 72 | 71 | 71 | 75 | 75 | 70 |
| | 60 | 59 | 74 | 73 | 73 | 76 | 76 | 71 |
| | 75 | 59 | 74 | 73 | 73 | | 76 | 71 |
| Crescent Tear | 30 | 65 | 285 | 280 | 238 | 225 | 235 | 303 |
| | 60 | 68 | 270 | 230 | 243 | 205 | 193 | 220 |
| | 75 | 73 | 243 | 231 | 225 | | 193 | 225 |
| NBS Abrasion Index, Percent | 60 | 74.8 | 63.6 | 77.2 | 109.5 | 143.5 | 131.4 | 68.2 |
| | 75 | 80.3 | 62.2 | 87.4 | 137.0 | 105.5 | 152.1 | 81.5 |
| Hardness, Shore A, NBS Specimens | 60 | 55 | 71 | 72 | 75 | 76 | 76 | 71 |
| | 75 | 56 | 73 | 73 | 75 | 76 | 76 | 72 |
| NBS Abrasion (Gum=100%) | 60 | 100 | 85 | 103 | 147 | 192 | 176 | 91 |
| | 75 | 107 | 83 | 117 | 183 | 141 | 204 | 109 |
| Compression Set "B" 22 hrs./158° F | 60 | 5.5 | 34.0 | 17.5 | 11.3 | 10.1 | 12.0 | 25.0 |
| | 75 | 5.1 | 36.7 | 16.5 | 12.0 | 9.5 | 11.0 | 23.9 |
| Mooney Viscosity, ML 4'/212° F | | | 44 | 60 | 65 | 65 | 83 | 65 | 64 |
| Mooney Scorch, MS/265° F | | | 23 | 26 | 20 | 16 | 12.5 | 18 | 23 |

Table II demonstrates dramatic improvements in properties of polyurethane filled with amino organosilane modified clays.

When modified carbon black is used as the filler in a rubber recipe, good results compared to unmodified black are achieved with a 2% by weight modification using gamma aminopropyltriethoxysilane. The results listed in Table III are based upon tests in the following recipe.

| | Parts/100 RHC |
|---|---|
| Smoked sheet | 100.0 |
| ISAF carbon black | 45.0 |
| Zinc oxide | 3.0 |
| Stearic acid | 3.0 |
| Pine tar | 3.0 |
| Age rite HP [1] | 1.0 |
| NOBS special [2] | 0.35 |
| Sulfur | 2.75 |
| Total | 158.10 |

[1] An antioxidant containing phenyl-beta-naphthylamine and N,N'-diphenyl-para-phenylenediamine.
[2] Accelerator containing N-oxydiethylene benzothiazol-2-sulfenamide.

The batches were mixed on a Banbury using speed #1, ram pressure of 30 p.s.i., and a starting temperature of 125° F.; the final batch mix was on a 6-inch by 12-inch mill and the inlet water temperature was 158° F. The compound was cured for 70 minutes at 275° F., then tested. The results are listed in Table III.

TABLE III

| Pigment | Percent Modifier | Modulus, p.s.i. | Tensile, p.s.i. | Abrasion, Huber-Williams |
|---|---|---|---|---|
| ISAF Carbon Black Control | None | 1,780 | 4,590 | 100.0 |
| ISAF Carbon Black | ([1]) | 1,970 | 4,720 | 107.9 |

[1] 2.0% gamma aminopropyltriethoxysilane.

This data indicates that when carbon black is modified with controlled amounts of modifier, the properties which resistance when compared to these same properties in rubber filled with unmodified Zeolex. The results in Table IV are based upon the following recipe:

| | Parts/100 RHC |
|---|---|
| GRS 1502 [1] | 100.0 |
| Pliolite S6B [2] | 20.0 |
| Zinc oxide | 3.0 |
| Stearic acid | 2.0 |
| Cumar MH 2½ [3] | 7.5 |
| Zeolex 23 | 66.5 |
| Santocure [4] | 2.0 |
| DOTG [5] | 1.0 |
| Sulfur | 2.5 |
| Total | 204.5 |

[1] Emulsion copolymer of 23.5% styrene and 76.5% butadiene.
[2] A styrene-butadiene copolymer of high styrene content.
[3] Para-cumarone-indene resin.
[4] n-Cyclohexyl-2-benzothiazole sulfenamide accelerator.
[5] Di-ortho-tolylguanidine.

The recipe was mixed on a Banbury mixer at speed #1, ram pressure of 30 p.s.i., and at a starting temperature of 125° F. The final batch was mixed on a 6-inch by 12-inch mill with a water inlet temperature of 158° F. The compound was cured at 292° F., then tested. The results are shown in Table IV.

TABLE IV

| Cure Minutes | 200% Modulus | 300% Modulus | 400% Modulus | Tensile | Elongation |
|---|---|---|---|---|---|
| PIGMENT—ZEOLEX 23 UNMODIFIED—CONTROL | | | | | |
| 5 | 80 | | | 80 | 280 |
| 10 | 80 | | | 80 | 280 |
| 15 | 470 | 650 | 860 | 1,300 | 605 |
| 20 | 720 | 1,000 | 1,350 | 1,640 | 460 |
| 30 | 750 | 1,060 | 1,450 | 1,560 | 420 |
| PIGMENT—ZEOLEX 23 MODIFIED WITH 10% GAMMA AMINOPROPYLTRIETHOXYSILANE | | | | | |
| 5 | 690 | 1,010 | 1,340 | 1,970 | 580 |
| 10 | 910 | 1,300 | 1,710 | 2,480 | 550 |
| 15 | 1,010 | 1,400 | 1,820 | 2,360 | 510 |
| 20 | 1,070 | 1,480 | 1,920 | 2,280 | 470 |
| 30 | 1,090 | 1,480 | 1,940 | 2,360 | 480 |

| Pigment | Abrasion Index [1] | | | Shore Hardness | | |
|---|---|---|---|---|---|---|
| | 10' | 15' | 20' | 10' | 15' | 20' |
| Zeolex 23 Control | ([2]) | 41.5 | 47.5 | 60 | 72 | 77 |
| Modified Zeolex 23 | 61.7 | 63.0 | 62.3 | 76 | 76 | 77 |

| Pigment | Tear Resistance, Avg. | | | |
|---|---|---|---|---|
| | 5' | 10' | 15' | 20' |
| Zeolex 23 Control | 37.5 | 38.5 | 174 | 160 |
| Modified Zeolex 23 | 216.5 | 193.5 | 195 | 187.5 |

[1] Percent of NBS Standard sample.
[2] Not cured.

The results indicate that Zeolex 23 modified with gamma aminopropyltriethoxysilane, when compared with unmodified Zeolex 23 used as a filler for rubber, is faster curing, has increased modulus, increased tensile strength, and improved tear resistance and abrasion resistance.

It should also be noted that physical and "wet" electrical properties of filled resin systems can be significantly improved by treating the fillers in accordance with this invention.

I have found that in addition to the concepts disclosed above, the properties of the modified pigments are affected by the solvent used in their preparation.

The properties of carbon blacks, clays and silicates modified in aqueous systems, such as disclosed in Example 2, vary markedly from the properties of these same pigments modified in nonaqueous systems as disclosed in Examples 1 and 3.

In order to demonstrate these differences, regular Suprex clay, Suprex clay of Example 2, and Suprex clay modified in nonaqueous solvent according to the teachings of Example 7 were used in producing rubber compounds using the following recipe.

|  | Parts by weight |
|---|---|
| Smoked sheet [1] | 100 |
| Clay (as specified in Table V) | 104 |
| Zinc oxide | 5 |
| Sulfur | 3 |
| Captax | 1 |
| Stearic acid | 4 |

[1] Natural rubber.

The compounds were mixed on a 6-inch by 12-inch laboratory mill and then cured at 260° F. to produce 30-, 45-, and 60-minute cures of each.

Table V below compares the abrasion index and the 200% modulus level of each of the test materials.

TABLE V

| Clay | Abrasion Index, Percent | | | 200% Modulus p.s.i. | | |
|---|---|---|---|---|---|---|
| | 30' | 45' | 60' | 30' | 45' | 60' |
| Suprex Control | 55.0 | 55.9 | 53.7 | 760 | 960 | 990 |
| Suprex 3% Modifier (Benzene) | 72.8 | 68.6 | 65.2 | 2,000 | 2,070 | 2,170 |
| Suprex 3% Modifier (Water) | 84.6 | 85.5 | 70.7 | 1,740 | 1,970 | 1,990 |

The results as set forth in Table V clearly indicate that clays modified in accordance with the invention impart superior properties to rubber compounds when used as a filler therein. These results also demonstrate that the clays modified in an aqueous system give a higher abrasion resistance and a lower modulus than clays modified in a nonaqueous system.

While natural rubber was used in the recipes tested in Table V, these tests were also conducted with similar results from recipes using SBR, polyurethanes and polybutadiene.

The foregoing is illustrative only and additional modifications may be made without departing from the substance of the invention as defined in the appended claims.

I claim:
1. A finely divided particulate inorganic pigment surface modified with from about 1% to 15%, based on the weight of the dry pigment, of an amino organosilane of the formula

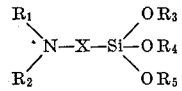

wherein $R_1$ is selected from the group consisting of hydrogen, alkyl, aryl, cycloalkyl, and alkylaryl, $R_2$ is selected from the group consisting of hydrogen, alkyl, aryl, cycloalkyl and alkylaryl, $R_3$ is selected from the group consisting of hydrogen, lower alkyl, aryl, lower alkylaryl, and lower arylalkyl, $R_4$ is selected from the group consisting of hydrogen, lower alkyl, aryl, lower alkylaryl, and lower arylalkyl, $R_5$ is selected from the group consisting of hydrogen, lower alkyl, aryl, lower alkylaryl, and lower arylalkyl, X is selected from the group consisting of alkylene, arylene, alkylarylene, arylalkylene, cycloalkylene containing secondary amino nitrogen, and cycloalkylene containing tertiary amino nitrogen.

2. A compound as in claim 1 wherein the finely divided particulate filler is selected from the group consisting of synthetic silicas, silicates, metal oxides, calcium carbonates, zinc sulfides, and carbon blacks.

3. A compound as in claim 1 wherein the amino organosilane is gamma aminopropyltriethoxysilane.

4. A compound as in claim 1 wherein the amino organosilane is a diamino functional silane.

5. Finely divided particulate hydrated silica, surface modified with from about 1% to 15% by weight based upon the weight of the silica of gamma aminopropyltriethoxysilane.

6. Finely divided particulate sodium alumino silicate pigment, surface modified with from about 1% to 15% by weight, based upon the weight of the pigment, of gamma aminopropyltriethoxysilane.

7. Finely divided particulate carbon black, surface modified with from about 1% to 15% by weight, based upon the weight of the carbon black, of gamma aminopropyltriethoxysilane.

8. Finely divided particulate kaolin clay, surface modified with from about 1% to 15% by weight, based upon the weight of the kaolin clay, of gamma aminopropyltriethoxysilane.

References Cited by the Examiner

UNITED STATES PATENTS

| 2,742,378 | 4/1956 | Te Grotenhuis | 106—308 |
| 3,015,569 | 1/1962 | Frieser | 106—308 |

FOREIGN PATENTS

| 863,412 | 3/1961 | Great Britain. |

TOBIAS E. LEVOW, *Primary Examiner.*

J. E. POER, S. E. MOTT, *Assistant Examiners.*